United States Patent [19]

Neel et al.

[11] Patent Number: 5,334,314

[45] Date of Patent: Aug. 2, 1994

[54] COMPOSITION MEMBRANE FOR SEPARATING WATER FROM FLUIDS CONTAINING ORGANIC COMPONENTS BY MEANS OF PERVAPORATION

[75] Inventors: Jean M. L. Neel, Villers-les-Nancy; Quang T. Nguyen, Ludres, both of France; Hartmut Bruschke, NuBloch, Fed. Rep. of Germany

[73] Assignee: Deutsche Carbone AG, Frankfurt, Fed. Rep. of Germany

[21] Appl. No.: 741,508

[22] PCT Filed: Dec. 3, 1990

[86] PCT No.: PCT/EP90/02074

§ 371 Date: Oct. 1, 1991

§ 102(e) Date: Oct. 1, 1991

[87] PCT Pub. No.: WO91/08043

PCT Pub. Date: Jun. 13, 1991

[30] Foreign Application Priority Data

Dec. 1, 1989 [DE] Fed. Rep. of Germany ....... 3939841
Dec. 1, 1989 [DE] Fed. Rep. of Germany ....... 3939867

[51] Int. Cl.$^5$ ............................................. B01D 61/36

[52] U.S. Cl. ................................. 210/640; 210/500.42

[58] Field of Search ............... 210/640, 651, 652, 490, 210/500.42

[56] References Cited

U.S. PATENT DOCUMENTS

| | | | |
|---|---|---|---|
| 4,802,988 | 2/1989 | Bartels et al. | 210/640 |
| 4,915,834 | 4/1990 | Brüschke | 210/321.84 |
| 5,019,261 | 5/1991 | Stengaard | 210/490 |
| 5,039,421 | 8/1991 | Linder et al. | 210/651 |

*Primary Examiner*—Frank Spear
*Attorney, Agent, or Firm*—Banner, Birch, McKie and Beckett

[57] ABSTRACT

Composite membrane-for separating water from fluid mixtures containing organic components by means of pervaporation comprising a separating layer of cross-linked polyvinyl alcohol, which has been subjected to a post-cross-linking by treatment with acids acting in the vapor phase on the polyvinyl alcohol layer. The acids are preferably hydrohalic acids, sulfurous acid, sulfuric acid, nitrous acid, nitric acid or acetic acid.

26 Claims, No Drawings

COMPOSITION MEMBRANE FOR SEPARATING WATER FROM FLUIDS CONTAINING ORGANIC COMPONENTS BY MEANS OF PERVAPORATION

The invention relates to a composite membrane for separating water from fluid mixtures containing organic components by means of pervaporation, a pervaporation process as well as the use of the composite membrane in pervaporation processes.

It is known that water can be separated from fluid mixtures containing organic components by various processes. One such conventional process employed especially for dehydration of fluids is the distillation method, by which a separation takes place corresponding to the volatility of the components. Distillation columns are necessary for this with auxiliary equipment, pumps, heat exchangers for heating and condensation, etc., which require a considerable capital investment. In addition, distillation methods require extensive instrumentation and control systems, as distillation columns can only be operated in a narrow utilization range.

When only a small amount of water is to be separated by distillation from a fluid mixture, in which water is the higher boiling point component, the entire remaining, non-aqueous portion must be evaporated and condensed at the head of the distillation column. Depending on the form of the distillation curve (liquid-vapor equilibrium) it may become necessary to multiply evaporate the entire non-aqueous portion to achieve the desired separation. The energy input required for this leads to considerable costs.

If the boiling point of the non-aqueous components of the mixture is at a higher temperature than the boiling point of water, then in principle only the water must be distilled and condensed at the column head. The entire non-aqueous portion, however, must in any case be heated to its boiling point, which can lead to an undesired thermal loading and to decomposition of the organic components. The energy input in this case can also be considerable due to the high enthalpy of evaporation of water and the necessity of operating the distillation column with a certain amount of reflux.

Increasingly stringent environmental protection provisions make it necessary in both cases to separate the purest possible water, so that it can be discarded without further treatment, i.e. can be diverted into naturally occurring waters. This needed purity of the separated water in many cases requires disproportionately higher costs for equipment, instrumentation and control means and energy in distillation methods, to remove the remaining small amounts of high or low boiling point components from the separated water.

When the mixture to be separated contains organic components with both a higher and a lower boiling point than water, the removal of water through simple distillation is no longer possible. Moreover, a multi-stage repetitive distillation is necessary, combined with an increased investment and use of energy.

Many mixtures of organic liquids with water in certain compositions have azeotropic points, at which the liquid has the same composition as the vapor in equilibrium with it. Such mixtures cannot be separated by normal distillation, but only through complicated processes. Frequently, an additional substance is added to break down the azeotropy. This additional substance must subsequently be completely removed and recovered from both product streams.

Similar difficulties as in distillation also arise in the removal of water by adsorption or absorption from organic components. The amount of adsorption agents increases strongly with increasing amounts of water to be removed and with decreasing final concentration of water in the product. In addition, the difficulties in regeneration of the adsorption agent increase.

The pervaporation method is a method for dehydration of fluid mixtures containing organic components, which substantially avoids the above-mentioned drawbacks. According to this method, the mixture to be dehydrated is contacted with the side of a non-porous membrane, where this membrane has a particularly high permeability to water, while organic components are non-permeable or pass only to a very small degree. If the chemical potential on the second side of the better permeating component, i.e. water, is set sufficiently below the value of the chemical potential on the first side, water can pass through the membrane. The reduction of the chemical potential on the second side of the membrane typically is made by a lowering of the partial vapor pressure of the preferred permeating component. The permeate passing through the membrane is therefore removed from the second side of the membrane in vapor form, for example by pumping, condensation or other suitable means. Instead of a liquid mixture, the equilibrium vapor of the mixture can also be applied to the feed side of the membrane.

A number of membranes and membrane materials are described in the relevant literature, which are suitable for the method of pervaporation. Mentioned here are polyperfluorosulfonic acid (Cabasso, Liu; J. Memb. Sci. 24, 101 (1985)), sulfonated polyethylene (Cabasso, Korngold, Liu; J. Pol. Sci., Letters, 23, 57 (1985)), polyacrylonitrile (Neel, Aptel, Clement; Desalination 53, 297 (1985)), cellulose triacetate (Wentzlaff, Böddeker, Hattenbach; J. Memb. Sci. 22, 233 (1985)), polymaleimidacrylonitrile (Yoshikawa et al.; J. Pol. Sci., 22, 2159 (1984)) or ion exchange membranes (Wentzlaff, Böddeker, Hattenbach; J. Memb. Sci. 22, 233 (1985)), cross-linked polyvinyl alcohol (Brüschke, EP-A-0 096 339), cross-linked polyvinyl alcohol (Bartels, J. Reale; U.S. Pat. No. 4,802,988).

The efficiency of a pervaporation membrane is largely determined by its selectivity and also its specific flow. The selectivity is normally given as the ratio of the concentration of the better permeating component to the concentration of the poorer permeating component in the permeate, divided by the corresponding concentration ratio in the feed mixture to be separated.

$$\alpha = \frac{\left(\frac{c_1}{c_2}\right)_{Permeate}}{\left(\frac{c_1}{c_2}\right)_{Feed}}$$

In practical application, however, it is found that this parameter is not very descriptive. Rather, it has been found more favorable to represent the concentration of the better permeating component in the permeate as a function of the concentration of the better permeating component in the feed in the form of a curve. The transmembrane flow is also a function of the composition of the feed. It is usually given as permeate amount per membrane area and per unit time, i.e. $kg/h \cdot m^2$, for the better permeating component. A further essential criterion for the suitability of the pervaporation membrane is its chemical and thermal stability. To obtain a high trans-membrane flow and a sufficient driving force, it is necessary to operate the pervaporation process at the highest possible temperatures. This however means that the membrane will be in contact with a feed mixture at high temperature, which has a high concentration of organic components, for example organic solvents. To achieve an economical lifetime of the membranes all components of the membrane must be long durable under these aggressive conditions.

In a commercial embodiment, the membrane is a composite membrane which essentially consists of three layers:

a) A carrier layer of a fleece or fabric, preferably of polyester, which provides the necessary mechanical stability and tear-resistance.

b) Provided thereon is a microporous membrane preferably with asymmetric pore structure, i.e. with varying pore diameter across the thickness of the membrane. Polymers such as polyacrylonitrile, polysulfone or hydrolyzed cellulose acetate are used as material for this microporous layer, that is polymers which are known to form microporous layers. The pore size of this layer should be as uniform as possible.

c) Upon this microporous layer is a pore-free separating layer of cross-linked polyvinyl alcohol. The polyvinyl alcohol forming the separating layer is cross-linked by esterification, etherification or acetalization or by a combination of these reactions. Typical cross-linking agents are dicarboxylic acids or dicarboxylic halogens for forming esters; dialdehydes and aldehydes for forming acetates; dihalogen compounds for forming ethers, as well as combinations of these cross-linking agents.

These composite membranes are particularly suited for dehydration of neutral organic solvents, for example simple alcohols, esters, ethers or ketones, or mixtures of neutral organic solvents, which have a maximal water concentration of about 15 wt. %. The water content of the dehydrated end-product is 200 ppm or less.

The pervaporation membrane described in U.S. Pat. No. 4,802,988 also comprises a multilayered structure. A fleece of polyester serves as the preferred carrier layer for the membrane. A porous back-up layer of polysulfone or polyethersulfone is provided thereon, which has an asymmetric pore structure. The actual pore-free separating layer consists of cross-linked polyvinyl alcohol. To form the non-porous separating layer, polyvinyl alcohol is cross-linked with an aliphatic dialdehyde with at least three carbon atoms, typically glutardialdehyde, in the presence of aqueous sulfuric acid. This composite membrane has a particularly high retention capability for ethylene glycol, however is less well suited for the dehydration of ethanol or of organic solvents with approximately the same molecular weight as ethanol due to the selectivity.

The subject-matter of the invention is then a composite membrane for separating water from fluid mixtures containing organic components by means of pervaporation, comprising a separating layer of cross-linked polyvinyl alcohol, which is characterized in that the polyvinyl alcohol-separating layer has been subjected to a post-cross-linking by treatment with acids, which act on the polyvinyl alcohol layer in the vapor phase.

The invention further relates to a process for separating water from fluid mixtures containing organic components by means of pervaporation, where the liquid mixture to be dehydrated is contacted with a first side of a composite membrane, while the chemical potential of water on the second side of the membrane is maintained at a value, which is lower than that of the chemical potential of water on the first side, where the process is characterized in that it is carried out using the above-mentioned composite membrane.

The invention further relates to the use of the above-mentioned composite membrane for pervaporation. The composite membrane of the invention possesses a substantially higher selectivity than the known membranes. The composite membrane in accordance with the invention makes dehydration with the pervaporation method possible even for very high water concentrations of the liquids, where the water concentration can be up to 99 wt. %. The individual layers of the composite membrane in accordance with the invention are described in detail in the following.

The Polyvinyl Alcohol Separating Layer

The polyvinyl alcohol separating layer causes the separation of water from fluids containing organic components by means of the pervaporation method. The layer consists of a non-porous film of cross-linked and post-cross-linked polyvinyl alcohol having a thickness of preferably 0.5 to 10$\mu$, more preferably 1 to 4$\mu$. Polyvinyl alcohol is produced for example by hydrolysis of polyvinyl acetate, where the amount of hydrolysis is preferably 50 to 100%, more preferably 98 to 100%. The polyvinyl alcohol has a molecular weight of 20,000 to 200,000, preferably 100,000 to 150,000. The molecular weight of polyvinyl alcohol here is preferably distinctly greater than the cut-off value of the porous backing layer, such that the polyvinyl alcohol molecules do not penetrate into the pores of the porous backing layer.

The non-porous separating layer is preferably formed by applying a solution of polyvinyl alcohol onto a porous backing layer. Aqueous solutions of polyvinyl alcohol are preferred with a polyvinyl alcohol concentration of 0.5 wt. % up to the solubility limit of polyvinyl alcohol in water, which depends on the degree of hydrolysis and molecular weight of the polyvinyl alcohol. More preferred are polyvinyl alcohol concentrations of 3 to 10 wt. %, even more preferred 5 to 8 wt. %.

The cross-linking agents can be added to the polyvinyl alcohol solution, for example dicarboxylic acids or dicarboxylic acid halides, dialdehydes or formalin, dihalogen compounds or mixtures of these cross-linking agents are added. The molar concentration of the cross-linking agent can lie in a broad range depending on its nature, solubility and composition and is preferably 0.01 to 1 mole cross-linking agent per mole of vinylalcohol monomer, more preferably 0.05 to 0.3 mole per mole vinylalcohol.

After applying the polyvinyl alcohol solution to the porous backing layer, crosslinking (pre-cross-linking) takes place during drying under the action of the cross-linking agent. Elevated temperatures between room temperature and 200° C. accelerate the drying and cross-linking. The temperature will normally lie in the range of 80° C. to 180° C., preferably 100° C. to 150° C. The cross-linking time is in the range of 1 to 60 min., preferably 5 to 30 min. The addition of mineral acids, for example sulfuric acid or hydrochloric acid accelerate the cross-linking action. The acids can be added directly to the polyvinyl alcohol solution, which already contains the cross-linking agent. The cross-linking takes place through etherification, esterification or acetalization of the hydroxyl groups of the polyvinyl alcohol where these reactions can also take place simultaneously. Suitable cross-linking agents are known to those skilled in the art. A few examples are described in the European Application EP-A 0 096 339. It has proven advantageous in some cases to apply a second solution of polyvinyl alcohol containing mineral acids in a second step. Here, the solution containing the cross-linking agent is first applied to the porous backing layer and dried at a temperature of 20° C. to 100° C., preferably 50° C. to 80° C. for 2 to 10 min., preferably 4 to 5 min. A second layer is applied to the pre-dried film of polyvinyl alcohol, which consists of a polyvinyl alcohol solution of 2 to 5 wt. %, preferably about 3.5 wt. % and a mineral acid, preferably sulfuric acid and/or hydrochloric acid in a mole ratio of 0.0001:1 to 0.1:1 to preferably about 0.01:1 of acid to polyvinyl alcohol monomer.

The Post-cross-linking

The obtained cross-linked (pre-cross-linked) polyvinyl alcohol separating layer is then (after drying) subjected to a further process step of post-cross-linking, in that one allows acids in the vapor phase to act upon the cross-linked (pre-cross-linked) polyvinyl alcohol layer.

Examples for suitable acids include mineral acids, such as hydrohalic acids (for example hydrochloric acid, hydrobromic acid or hydriodic acid), sulfurous acid, sulfuric acid, nitrous acid or nitric acid, as well as organic acids such as acetic acid, where mixtures of the above acids can also be employed. Instead of these acids, their anhydrides can also be used, in particular when these are present in gaseous or slightly vaporizable form. Finally, instead of the acids, acid-releasing compounds can also be used from which the acids are formed in situ under the reaction conditions.

Examples for suitable acid-releasing compounds are halohydrocarbons, in particular $\alpha, \omega$,-dihaloalkanes, preferably having 2 to 4 carbon atoms. Preferred examples include dichloro-, dibromo- and diiodalkane. Other examples include salts of acids which decompose at elevated temperatures by releasing an acid, for example ammonium salts such as ammonium chloride. Further suitable examples are known to those skilled in the art.

The procedure of post-cross-linking can be carried out in various ways. In a preferred embodiment, the cross-linked (pre-cross-linked) polyvinyl alcohol layer is placed into a closable vessel, from which air can be removed down to a residual amount by pumping. The acid is then introduced into the vessel which is under pressure. The vessel or container is then subsequently heated, for example in an oven. The temperature for the post-cross-linking is preferably in the range of 100° C. to 230° C., more preferably 130° C. to 180° C. The duration of post-cross-linking depends on the desired degree of post-cross-linking and also on the temperature. The post-cross-Linking preferably takes place for 1 to 12 hours, more preferably 3 to 8 hours. After cooling, the vessel is vented, after which the post-cross-linked polyvinyl alcohol layer can be removed.

If the acid used for post-cross-linking is liquid or solid under normal conditions of temperature and pressure, it can also be placed in the post-cross-linking vessel from the beginning in an open dish or tray. The acid is then vaporized during evacuation and heating.

The ratio of amounts of acid to the surface area of the polyvinyl alcohol layer for post-cross-linking lies in a broad range. Even very small amounts of acid, for example 0.01 or 0.1 g acid per $m^2$ surface of the polyvinyl alcohol layer, produce a distinct effect. A precise upper limit cannot be readily determined. A practical upper limit is where with increasing amounts of acid, no improvement in the membrane properties or desired shortening of the reaction time is found in relation to the increased amount of acid. In general, acid amounts of 0.05 to 1 g acid per $m^2$ surface of the polyvinyl alcohol layer are suited. It has been found that the presence of small amounts of oxygen during the post-cross-linking reaction have a positive influence in many cases on the properties of the post-cross-linked membrane. The formation of ether bridges, carbon-carbon bridges between neighboring polyvinyl alcohol chains and also carbon double bonds can be determined spectroscopically. Therefore, in a particular embodiment the post-cross-linking is performed in the presence of an oxygen-containing gas at an oxygen partial pressure in the range of 1 to 100 mbar, preferably 2 to 50 mbar. This is most easily achieved by pumping the air out of the reaction vessel before reaching the mentioned partial pressure of oxygen.

For production reasons, the post-cross-linking of the polyvinyl alcohol layer takes place directly after its cross-linking (pre-cross-linking), however this manner of production is not a necessity. Rather one can also start with the commercially available composite membranes with polyvinyl alcohol separating layers for producing the post-cross-linked membrane. The commercial membranes have a relatively long store lifetime and can be subjected to the post-cross-linking.

The polyvinyl alcohol separating layer of the composite membrane is non-porous and void-free (free of holes). Non-porous means here that the layer has no extended, spatially and temporally permanent channels (pores) which connect both sides of the layer. Such layers or films are also called "dense" membranes. It is clear that they have a certain free volume, whose size and distribution depend on temperature, molecular size, degree of crystallization and other parameters. The distribution and location of the free volume are not fixed and change continuously due to the Brownjan molecular action. A diffuse material transport can take place through this free volume. Such non-porous layers and films differ distinctly from the so-called "microporous" membranes which contain spatially and temporally fixed pores with pore diameters greater than 10 Å, through which a convective transport or the so-called "pore diffusion" transport takes place (Knudsen diffusion) and which are applicable for example for ultrafiltration.

The Porous Backing Layer

The polyvinyl alcohol separating layer normally has too little mechanical stability for practical purposes and is therefore normally applied to a porous backing layer. The thickness of the porous backing layer is not critical as long as a sufficient mechanical rigidity is guaranteed. The thickness is preferably 40 to 200$\mu$, more preferably 50 to 100$\mu$. The porous backing layer has a very narrow pore size distribution with an average pore size of 5 to 100 nm, preferably 10 to 50nm. Preferably, an asymmetric pore structure is present. The corresponding cut-off value lies lower than 5,000 Daltons, preferably below 20,000 Daltons.

Preferably polymers with a glass transition temperature above 80° C. and a molecular weight in the range of 5,000 to 200,000, preferably 20,000 to 60,000 are used for the production of the porous backing layer. Examples of suitable polymers include polyacrylonitrile, polysulfone, polyether sulfone, polyether amide, polyvinyline fluoride, hydrolyzed cellulose tri-acetate, polyphenylene sulfide, copolymers of partially fluorinated polyolefins and polyeurethane.

The porous backing layers are preferably produced in a phase inversion process, however, porous backing layers can be used, which are formed in layers by depositing inorganic materials. The backing layer can also be formed in any suitable manner known in the art.

The Reinforcing Layer

For further improvement of the mechanical stability, in particular the tear-resistance, the composite membranes of the invention used in practice have a reinforcing layer below the porous backing layer, wherein the reinforcing layer presents no appreciable resistance to material transport through the membrane. Highly porous flexible fabric or fiber fleece is used as the reinforcing layer. Examples for suitable fiber materials include cotton, polyester, polyamide, metal, polyolefin, fluorinated polyolefin, polysulfone, polyether imide, polyphenylene sulfide or carbon. However. porous structures of glass, ceramic, graphite or metals can also be used, for example in the form of small thin tubes. The thicknesses of the carrier layer is also not critical; thickness of 50 to 150μ, for example about 100μ, have proven to be especially suitable in practice.

For the technical application, the composite membrane in accordance with the invention therefore consists of three layers in the following sequence: reinforcing layer/porous backing layer/non-porous separating layer of cross-linked and post-cross-linked polyvinyl alcohol. In the simplest embodiment, these composite membranes are flat membranes. In preferred embodiments, the composite membrane, however, can be tube-shaped, where the inside diameter is a few ram; otherwise, the structure is the same as for flat membranes.

In one particular embodiment, the invention relates to water separation from aqueous amine solutions or solutions of amine mixtures. In this case, the membrane apart from the desired separation properties of high selectivity and high trans-membrane flow, must also be durably resistant to hot amine solutions.

When dehydrating amine solutions, no special measures are necessary with respect to the separating layer of the membranes since the separating layer material, i.e. polyvinyl alcohol, is already resistant against hot amine solutions due to crosslinking.

Examples of amine-resistant materials for the porous backing layer are polysulfone, polyether sulfone, polyvinylidene fluoride, hydrolyzed cellulose triacetate, polyphenylene sulfide and copolymer of partially fluorinated polyolefins.

Examples of suitable mine-resistant materials for the carrier layer are highly porous flexible fabric or fleece made of fibers of, for example cotton, metals, polyolefins, fluorinated polyolefins, polysulfone, polyether amide, polyphenylene sulfide or carbon, however also porous structures of glass, ceramic, graphite or metal. Examples of preferred materials are carbon fiber fleece, cotton fabric, fleece of polyphenylene sulfide and porous graphite tubes.

The invention is further explained by way of the following examples.

EXAMPLE I

A polyacrylonitrile solution in dimethylformamide is applied to a polyester fleece of about 100μ thickness as reinforcing layer and precipitated in water. The obtained porous membrane has a thickness of about 200μ (including the reinforcing layer) an asymmetric pore structure and a retention capability for dextran molecules with a molecular weight of over 20,000. This PAN membrane was dried and covered with a 5% solution of polyvinyl alcohol, which contained 0.05 mole maleic acid per mole of polyvinyl alcohol monomer. After drying at 130° C., the obtained membrane was placed in a refined steel vessel having a volume of 2.5L. 0.1 g of solid 1,2-dibromoethane were located at the bottom of the refined steel vessel. To avoid a premature vaporization of the dibromoethane, the container was cooled to 0° C. and the air was suctioned off down to a residual pressure of 20 mbar. The refined steel vessel was then heated to 150° C. and held at this temperature for 5 hours. After cooling and venting, the membrane was removed and tested in a pervaporation experiment with an acetic acid/water mixture. The water content of the feed mixture was varied between 98% and 10%. The permeate for all feed concentrations consisted of more than 99.8% water, the membrane proved to be stable at temperatures up to 100° C. The permeate flow at 80° C. was $2.6 kg/m^2 \cdot h$ at a water concentration of 60% in the feed.

Under the same test conditions, polyvinyl alcohol composite membranes of the prior art lost their selectivity after a short time and could no longer be used for separation.

EXAMPLE II

The starting material was a commercially available composite membrane (GFT, Homburg) known in the art (EP-B 0 096 339), which comprised a porous backing layer of polyacrylonitrile on a polyester fleece as reinforcing layer and thereupon a separating layer of cross-linked polyvinyl alcohol. This membrane was subjected to a post-cross-linking as described in Example I, where a mixture of 0.05 g 1,2dibromoethane and 0.05 g 1,2-dichloroethane was used for post-cross-linking. The obtained post-cross-linked composite membrane as well as the starting membrane were then tested in a pervaporation test with respect to their ability to dehydrate an ethanol/water mixture. The results are given in Table 1.

TABLE 1

| Feed concentration Wt. % $H_2O$) | Permeate concentration post-cross-linked membrane Wt. % $H_2O$) | Permeate concentration starting membrane Wt. % $H_2O$) |
| --- | --- | --- |
| 90 | 99.8 | 90 |
| 80 | 99.9 | 82 |
| 70 | 99.8 | 80 |
| 60 | 99.9 | 80 |
| 50 | 99.9 | 80 |
| 40 | 99.8 | 85 |
| 30 | 99.9 | 92 |
| 20 | 99.9 | 95 |
| 10 | 99.9 | 96 |
| 5 | 99.8 | 95 |
| 2 | 99.0 | 80 |

Table 1 shows that with the post-cross-linked membrane of the invention the permeate consists practically exclusively of water at feed concentration above 5% and up to 90% water in the ethanol/water mixture. On the other hand, the permeate for the comparative membrane has the same composition at a water concentration of 90% in the feed, i.e. no separation (dehydration) at all takes place. Table 1 further shows that even at lower water concentrations in the feed, the comparison membrane is inferior to the post-crossed-linked membrane of the invention. The permeate flows of the two membranes was about the same at an operative temperature of 80° C.

EXAMPLE III

An ultrafiltration membrane of polyacrylonitrile with asymmetric pore structure (porous backing layer) on a polyester fleece (reinforcing layer) was coated with a solution of 6% polyvinyl alcohol in water which contained 0.05 mole maleic acid and 0.5 mole formaldehyde per 1 mole of polyvinyl alcohol monomer. After drying at 140° C., the membrane was placed in a refined steel vessel, it was closed and pumped down to a residual pressure of 20 mbar. Nitrogen was then introduced which was passed through concentrated aqueous hydrochloric acid and thus saturated with hydrochloric, until the pressure in the refined steel vessel was 500 mbar. The container was then heated over 4 hours at 180° C. After cooling and venting, the membrane was used in a pervaporation test with a feed mixture of 98 wt. % acetic butylester and 2 wt. % water. Only water was found in the permeate up to a concentration of 99.9 wt. % acetic butylester. At a feed concentration of 99% ester and a temperature of 90° C., the permeate flow at 145 g/m$^2$·h was distinctly higher than the flow under the same conditions (100 g/m$^2$·h) for the comparative membrane described in Example II, by which 35 wt. % acetic butylester was found in the permeate.

EXAMPLE IV

An ultrafiltration membrane of polyether imide with asymmetric pore structure (backing layer) was coated and dried as in Example III with a polyvinyl alcohol solution. The post-cross-linking was also performed as in Example III, except that the nitrogen was passed through an aqueous solution, which consisted of equal portions of concentrated hydrochloric acid and concentrated hydrobromic acid. In a pervaporation test, a stoichiometric mixture of acetic acid and ethanol, having 2 g/l sulfuric acid added thereto, was passed in circulation over the membrane. At a temperature of 85° C., only water was found in the permeate. After 6 hours, 98% of the acetic acid and ethanol had reacted to acetic ethylester.

EXAMPLE V

The composite membrane of Example III was subjected to a pervaporation test, where a pyridine/water mixture with decreasing water concentration (from 60 to 1 wt. %) was used as the feed. Only water was found in the permeate for all feed concentrations. The membrane was found to be stable even at a temperature of 100° C.

The same membrane was tested with a feed mixture consisting of 82.5% acetic acid, 15% monochloroacetic acid, and 2.5% water. In a test over 500 hours at a temperature of 95° C., the membrane proved to be stable and did not change its properties.

EXAMPLE VI

A membrane of cellulose triacetate was produced with the phase inversion process (porous backing layer) on a fleece of carbon fiber (reinforcing layer). The membrane was then stored for 7 days in an ammonia solution at 50° C., until the cellulose triacetate was completely hydrolyzed to cellulose. After thorough washing, a cross-linked and post-cross-linked polyvinyl alcohol separating layer according to Example III was applied to the obtained porous membrane.

The resulting composite membrane was then subjected to a pervaporation test with an ethanol/water mixture which was saturated with hydrochloric acid. The results obtained for water concentrations in the feed from 50 to 2 wt. % are similarly good as those in Table 1, i.e. practically only water is found in the permeate over the entire range of water concentrations.

EXAMPLE VII

An ultrafiltration membrane with asymmetric pore structure of a polyether sulfone was coated with a solution of 7% polyvinyl alcohol in water, to which 0.05 mole glutardialdehyde per mole polyvinyl alcohol monomer had been added.

After drying at 120° C., the membrane was placed in a refined steel vessel, which had a dish at its bottom containing 2 g of semi-concentrated sulfuric acid. The container was closed, air pumped off to a residual pressure of 400 mbar and the container was heated for 4 hours at 140° C. The obtained post-cross-linked membrane was subjected to a pervaporation test with glycol diethylether which contained 10 wt. % water. Less than 0.5% glycolether was found in the permeate at 95° C.

EXAMPLE VIII

The composite membrane of Example III was subjected to a pervaporation test, where the feed was a vapor mixture of isopropanol and water at 95° C. and at equilibrium pressure. At isopropanol concentrations of 70 to 99 wt. % in the feed, less than 0.2 wt. % isopropanol was found in the permeate.

EXAMPLE IX

A post-crossed-linked composite membrane was produced according to Example VII, however where the coating solution additionally contained 10 wt. % glycerol apart from polyvinyl alcohol and glutardialdehyde. The post-crossed-linking was performed as in Example VII. The completed composite membrane was subjected to a pervaporation test with a 40% aqueous citric acid solution as the feed mixture. The solution increased to a citric acid concentration of 65% at a temperature of 85° C.; the permeate contained exclusively water.

EXAMPLE X

The membrane of Example VI was used in a pervaporation test with a solution of 70 wt. % ethylamine and 30 wt. % water. At a feed temperature of 85° C., the ethylamine concentration increased to 95 wt. %. The permeate contained 85 wt. % water and 15 wt. % ethylamine. The permeate flow was determined to be 750 g/m$^2$·h. The membrane proved to be long lastingly stable.

EXAMPLE XI

A porous membrane of polysulfone with asymmetric pore structure was produced by phase inversion precipitation onto a fleece of carbon fiber. The average pore diameter on the surface was 35nm. After drying the membrane was coated and dried with a polyvinyl alcohol solution as in Example III. The dried membrane was placed in a refined steel vessel which contained a dish on its bottom with 3 g semi-concentrated sulfuric acid. The vessel was closed, air pumped off to a residual pressure of 50 mbar and the vessel was heated for 6 hours at 140° C. The membrane was subjected to a pervaporation test with a pyridine/water mixture at 95° C., where the water content of the mixture decreased from 60% to 1% during the test. Only water was found in the permeate at all feed concentrations.

EXAMPLE XII

A polysulfone membrane was produced as in Example XI, a fleece of polyphenylene sulfide fiber was used as the carrier. The dried porous membrane was coated with a solution of 7% polyvinyl alcohol in water, which contained 0.05 mole glutardialdehyde per mole polyvinyl alcohol monomer unit. The subsequent treatment was that of Example XI. In a pervaporation test, the membrane was stable at 100° C. with a feed mixture of dimethylamine and water. The water concentration varied from 30% to 5% and the permeate contained an average of 5% amine.

EXAMPLE XIII

An asymmetric porous membrane was produced from polyether sulfone as in Example XI, where a fabric of polytetrafluoroethylene was used as the carrier. The dried membrane was coated with a polyvinyl alcohol solution as in Example III. The solution additionally contained 0.05 mole malonic acid per mole polyvinyl alcohol monomer unit. The membrane was then treated in an evacuated refined steel vessel which contained 0.1 g of 1,2-dibromoethane by heating at 160° C. for 6 hours. The membrane was used in a pervaporation test with an aqueous solution of ethylidene diamine. The membrane was stable at a temperature of 100° C. for water concentrations between 20 and 5%.

We claim:

1. Composite membrane for separating water from fluid mixtures containing organic components by means of pervaporation comprising a non-porous separating layer of cross-linked polyvinyl alcohol, characterized in that the polyvinyl alcohol separating layer has been subjected to a post-cross-linking by treatment with acids, which act in the vapor phase on said polyvinyl alcohol layer.

2. Composite membrane of claim 1, characterized in that the acids are selected from hydrohalic acids, sulfurous acid, sulfuric acid, nitrous acid, nitric acid, acetic acid or mixtures thereof.

3. Composite membrane of claim 1, characterized in that the acids are obtained in situ by compounds which release an acid.

4. Composite membrane of claim 3, characterized in that the acid-releasing compounds are halohydrocarbons, in particular $\alpha,\omega$-dihalogen alkanes.

5. Composite membrane of claim 3, characterized in that the acid-releasing compounds are salts, in particular ammonium salts.

6. Composite membrane of claim 1, characterized in that the post-cross-linking is carried out at temperatures in the range of 100° C. to 230° C., in particular in the range of 130° C. to 180° C.

7. Composite membrane of claim 1 or 6, characterized in that the post-cross-linking is carried out in the presence of an oxygen-containing gas at an oxygen partial pressure in the range of 1 to 100 mbar, in particular in the range of 2 to 50 mbar.

8. Composite membrane of claim 1, characterized in that the polyvinyl alcohol layer subjected to post-cross-linking has been obtained by pre-crosslinking by means of etherification, esterification and/or acetalization.

9. Composite membrane of claim 1, characterized in that the separating layer lies on a porous backing layer consisting of polyacrylonitrile, polysulfone, polyether sulfone, polyether imide, polyurathane or hydrolyzed cellulose acetate.

10. Composite membrane of claim 9, characterized in that the porous backing layer comprises an asymmetrical pore structure with an average pore size in the range of 5 to 100 nm, in particular in the range of 10 to 50 nm.

11. Composite membrane of claim 10, characterized in that the porous backing layer lies on a reinforcing layer, said reinforcing layer being a fabric or fleece of fibers selected from polyester, polyethylene, polypropylene, PTFE, cotton, carbon, glass or metal.

12. Composite membrane of claim 9, characterized in that the porous backing layer lies on a reinforcing layer, said reinforcing layer being a fabric or fleece of fibers selected from polyester, polyethylene, polypropylene, PTFE, cotton, carbon, glass or metal.

13. Process for separating water from fluid mixtures containing organic components by means of pervaporation, where the fluid mixture to be dehydrated is contacted to a first side of a composite membrane, while the chemical potential of water on a second side of the membrane is maintained at a value lower than the chemical potential of water on said first side, characterized in that the process is carried out with a composite membrane of claim 1, 9, 11 or 12.

14. Process of claim 13, characterized in that the fluid mixture to be dehydrated is a liquid mixture.

15. Process of claim 13, characterized in that the fluid mixture to be dehydrated is in vapor form, in particular a saturated vapor.

16. Composite membrane of claim 1, characterized in that the polyvinyl alcohol of the separating layer is hydrolyzed to an amount in the range of 50 to 100%, in particular in the range of 98 to 100%.

17. Composite membrane of claim 1 or 16, characterized in that the polyvinyl alcohol of the separating layer has a molecular weight in the range of 20,000 to 200,000, in particular in the range of 100,000 to 150,000.

18. Composite membrane of claim 1, characterized in that the membrane comprises a porous backing layer and a reinforcing layer of amine-resistant material.

19. Composite membrane of claim 18, characterized in that the porous backing layer consists of polysulfone, polyether sulfone, polyether imide, polyvinylidene fluoride, hydrolyzed cellulose triacetate, polyphenylene sulfide or copolyesters of partially fluorinated polyolefins.

20. Composite membrane of claim 18 or 19, characterized in that the reinforcing layer is a highly porous flexible fabric or fleece, comprising fibers of cotton, metal, polyolefins, fluorinated polyolefins, polysulfone, polyether imide, polyphenylene sulfide or carbon, or the reinforcing layer is a porous structure of glass, ceramic, graphite or metal.

21. Process for dehydrating water-containing amine solutions by means of pervaporation, where the amine solution to be dehydrated is contacted to a first side of a composite membrane, while the chemical potential of water on a second side of the membrane is maintained at a value lower than the chemical potential of water on said first side, characterized in that the process is carried out with a composite membrane of claim 18.

22. Process of claim 21, characterized in that the amine solution to be dehydrated is a liquid mixture.

23. Process of claim 14, characterized in that the amine solution to be dehydrated is in vapor form, in particular a saturated vapor.

24. Process of claim 21, characterized in that the porous backing layer of said composite membrane consists of polysulfone, polyether sulfone, polyether imide, polyvinylidene fluoride, hydrolyzed cellulose triacetate, polyphenylene sulfide or copolymers of partially fluorinated polyolefins.

25. Process of claim 21, characterized in that the reinforcing layer of said composite membrane is a highly porous flexible fabric or fleece, comprising fibers of cotton, metal, polyolefins, fluorinated polyolefins, polysulfone, polyether imide, polyphenylene sulfide or carbon, or the reinforcing layer is a porous structure of glass, ceramic, graphite or metal.

26. Process of claim 21, characterized in that the porous backing layer of said composite membrane consists of polysulfone, polyether sulfone, polyether imide, polyvinylidene fluoride, hydrolyzed cellulose triacetate, polyphenylene sulfide or copolymers of partially fluorinated polyolefins and in that the reinforcing layer of said composite membrane is a highly porous flexible fabric or fleece, comprising fibers of cotton, metal, polyolefins, fluorinated polyolefins, polysulfone, polyether imide, polyphenylene sulfide or carbon, or the reinforcing layer is a porous structure of glass, ceramic, graphite or metal.

* * * * *